United States Patent [19]
Rodine

[11] 3,764,902
[45] Oct. 9, 1973

[54] PHASEMETER EMPLOYING MEANS FOR PREVENTING ERRORS IN THE PHASE READING PRODUCED BY NOISE

[75] Inventor: Thomas G. Rodine, Loveland, Colo.

[73] Assignee: Hewlett-Packard Company, Palo Alto, Calif.

[22] Filed: Apr. 24, 1972

[21] Appl. No.: 246,625

[52] U.S. Cl. .............................. 324/83 R, 328/133
[51] Int. Cl. ..................... G01r 25/00, H03d 13/00
[58] Field of Search ............. 324/83 R, 83 A, 83 D; 328/109, 133, 165

[56] References Cited
UNITED STATES PATENTS
3,629,712  12/1971  Clark .................................. 328/109

Primary Examiner—Alfred E. Smith
Attorney—A. C. Smith

[57] ABSTRACT

A phasemeter employing means for converting each of the two incoming AC signals into square wave signals and including a pair of phase detectors, one of said phase detectors being triggerable to a first state responsive to one transition of the first square wave and being triggerable to a second state by one transition of said second square wave, said other phase detector being triggerable to a first state responsive to another transition of the first square wave and being triggerable to a second state responsive to another transition of the second square wave, the time interval of said two phase detectors in said separate states serving as a measure of the phase difference between said two incoming signals. False triggering of either of said phase detectors due to noise on one of the incoming signals producing multiple transitions of said associated square wave is corrected by utilizing a logic circuit for detecting the instantaneous states of the two square wave signals and the two phase detectors and producing an error signal when one of said phase detectors is in the incorrect state for changing it to the correct size.

7 Claims, 15 Drawing Figures

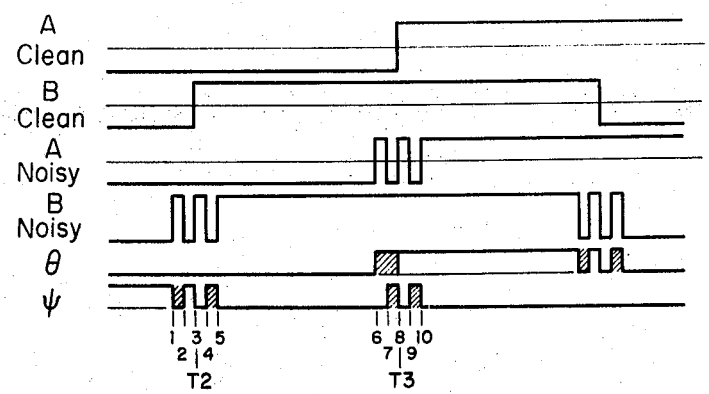
Figure 6
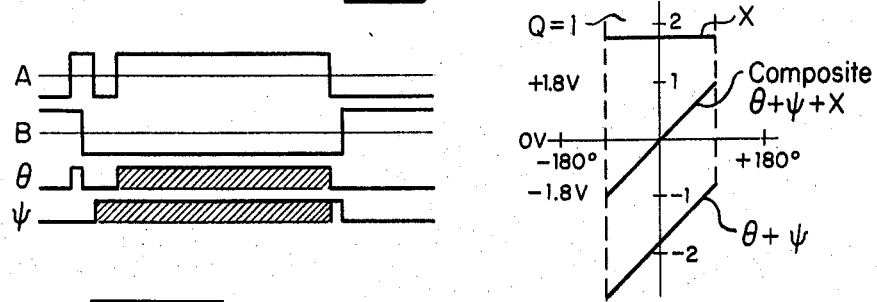
Figure 7
Figure 8
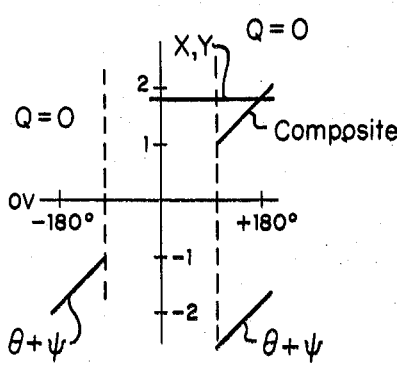
Figure 9
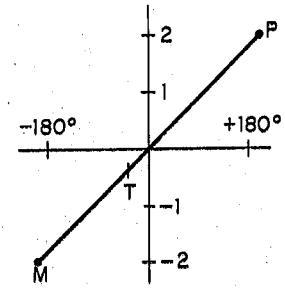
Figure 10

3,764,902

PHASEMETER EMPLOYING MEANS FOR PREVENTING ERRORS IN THE PHASE READING PRODUCED BY NOISE

BACKGROUND OF THE INVENTION

Phasemeters for providing a readout of the phase difference in degrees between two alternating frequency waves, for example a signal channel and a reference channel, are in general use. In one common form of phasemeter, the signal and reference sine wave inputs are each amplified and then limited to form symmetrical square waves. These two square waves are each applied to associated zero crossing detectors which produce sharp pulses at each zero crossing to trigger divide by two flip-flops on either the positive or the negative-going zero crossings. Gating together the divider outputs produces a pulse train with the width or duration of the pulse directly proportional to the phase difference. The pulse duration is converted to a DC voltage with an amplitude operating a DC meter calibrated in degrees. One typical phase meter is described in an article by C. J. Paull entitled "Phase Measuring With Increased Accuracy" in Electronic Engineering, July, 1971, pages 52–55.

As noted in this article, zero crossing phasemeters are sensitive to noise on either or both of the incoming signals. Where the signals are narrow band, noise may be filtered out. However, where the phasemeter is to operate over a wide frequency range, a plurality of such filtering circuits is needed with means for switching from filter to filter as the frequency changes. The noise produces multiple zero crossings resulting in false or multiple triggering in the divider circuits. Excessive noise renders wild fluctuations in the meter reading.

SUMMARY OF THE PRESENT INVENTION

In the present invention, a phase measuring system is employed wherein the noise induced transitions of the phase detector are permitted to occur, and means is provided for detecting the incorrect state of the pulse detector and for changing the phase detector to the correct state.

In a preferred embodiment, the two incoming AC signals are converted to square wave signals each having two possible states, and logic circuitry is provided for detecting the instantaneous states of the two square wave signals and the phase detector and developing therefrom a correction signal for correcting the state of the phase detector from the incorrect to the correct state.

For improved correction, two phase detectors are utilized, with one possible zero crossing of the first incoming signal producing a first transition in the first phase detector and one possible zero crossing of the second incoming signal producing an opposite transition in the first phase detector. The other two zero crossings of the two incoming signals are used to produce the two possible transitions in the second phase detector. The logic circuitry detects the instantaneous states of the two square wave signals associated with the two incoming signals and the states of the two phase detectors, and develops from these four detected states an error signal utilized to correct for an incorrect transition in one of the phase detectors.

DESCRIPTION OF THE DRAWINGS

FIGS. 1 through 7 are pulse diagrams illustrating the errors generated in a phase measuring system.

FIGS. 8, 9, and 10 illustrate the off-set voltages added to the output voltages of the phase detectors to obtain the final output.

DESCRIPTION OF THE PREFERRED EMBODIMENT

Figure 1:
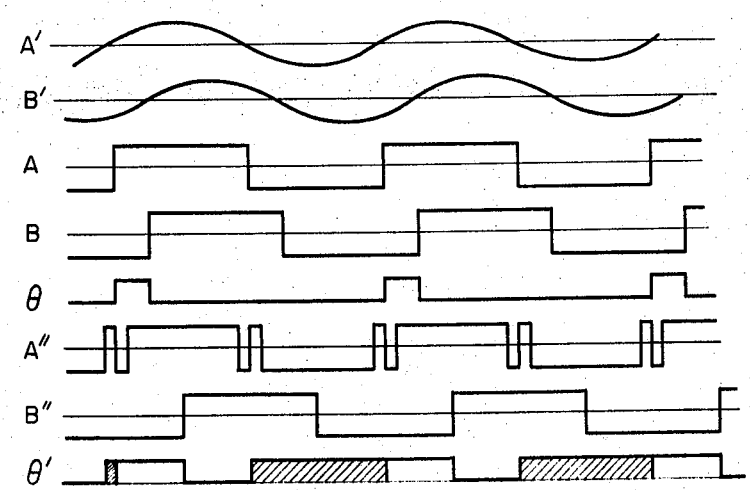

Referring to FIG. 1, one incoming signal is shown as sine wave A' and the incoming signal on the other channel is shown as sine wave B'. These two signals are amplified and then limited to give the two associated square waves A and B, respectively, with sharp leading edges at the positive-going zero crossings and sharp trailing edges at the negative-going zero crossings.

A trigger circuit, for example a phase detector, turned on by the leading edge of square wave signal A and turned off by the leading edge of square wave signal B produces a pulse $\theta$ that has a time duration relative to the time of one cycle which is proportional to the phase difference of the two signals A and B. A DC voltage signal is developed proportional to this time duration and then converted to a reading in degrees.

It is desirable that the phasemeter have a wide dynamic range and broadband frequency response: for example, a response to inputs of 1 millivolt to 1 volt over a frequency range of 10Hz to 1MHz. However, such a broadband system is subject to noise, and this noise may cause the phase readings to be incorrect.

Assume that the phase relationship of two signals at 20Hz and 1 volt level is being measured. If one or both of the signals has some high frequency noise with an amplitude of 1 millivolt or greater, the instrument will respond to the noise because its dynamic range extends to the millivolt level and an error will result. The amplified noise will cause the limited signal to have multiple zero crossings where it should have only one.

In one instance as shown by trace A'' in FIG. 1, square wave A'' has two positive going transitions at its leading edge instead of one, and a negative going transition in between where there should be none. It also has two negative-going transitions at its trailing edge instead of one, as well as a false positive-going transition. Square wave B'' is shown 90° out-of-phase with A'' and with no noise problem. The pulse $\theta'$ is initiated slightly early because of pretriggering by the slightly early positive-going transition of A'' and is terminated by the positive-going transition of B''. However, the false positive-going transition of A'' at its trailing edge triggers pulse $\theta'$ approximately 180° too soon. The pulse $\theta'$ remains high through the subsequent positive-going transition of A'' about 180° later and goes low on the next positive-going transition of B''. False triggering will produce an error represented by the hatch region of pulse $\theta'$ of about 180° in the meter reading.

In the illustration of FIG. 1, the noise was on channel A only and the signals were shown at a phase angle difference giving about a 180° error. A different phase difference between signal A and B will give a different error reading. For example, if square wave B'' were shifted relative to square wave A″ so that the positive going transition of wave B″ occurred shortly after the normal negative going transition of wave A″, the error would be substantially smaller than 180°. This occurs due to the fact that the false positive-going transition of A″ at its normally negative-going transition does not affect $\theta'$ since $\theta'$ would still be high because the positive-going transition of B″ had not yet occurred to set $\theta'$ low.

If the noise is just large enough to cause occasional false triggers, the phase reading will be unstable. If the noise is large enough to cause continuous false triggering, the readings will be constantly incorrect. The actual point where the problem shows up is a function of the dynamic range and bandwidth of the phasemeter, the frequency of the input signals, and the amplitude and bandwidth of the noise. Noise filtering has not proven to be a satisfactory solution to this problem.

In the present invention, the noise on the incoming signal is permitted to produce the false triggering, the error state is then detected, and the state is corrected.

The information available from the illustration of FIG. 1 consists of the input signals A and B, the output pulse train, $\theta$, in which the duty cycle of the pulses is proportional to the phase difference of A and B, and the DC value of the pulse train.

In order to provide sufficient information to sense an error and correct it, due to the various manners in which the error can be produced, a second trigger circuit or phase detector is employed in the preferred embodiment of this invention.

Figure 2:
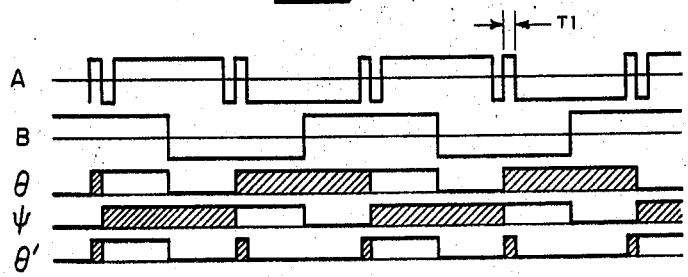

In this arrangement, the $\theta$ phase detector is turned on by a positive transition of channel A and turned off by a negative transition of channel B. The $\Psi$ phase detector is turned on by a negative transition of channel A and off by a positive transition of channel B. This situation is shown in FIG. 2, and it is assumed that noise on channel A is producing multiple transitions at both the positive and negative-going transitions.

It is noted that the false positive-going transitions at the normally negative-going transition of A turns $\theta$ on much too early and results in the 180° error discussed above. In addition, the false negative-going transition at the normally positive-going transition point of A results in turning on pulse $\Psi$ too early.

Looking first at the time interval T1, the equation $$A \cdot \overline{B} \cdot \theta \cdot \Psi \tag{1}$$

is true and $\theta$ is in the error state. This equation can also be true if signal B is shifted 180°, but in this latter case $\theta$ is in the correct state. Therefore, the state cannot be corrected while the noise pulse exists because the state is a valid state for some phase readings.

After the noise is gone following T₁, the equation $$\overline{A} \cdot \overline{B} \cdot \theta \cdot \Psi \tag{2}$$

is true; this particular equation does not become true, i.e., equal to 1, for any valid phase readings. By utilizing a logic gate to detect when this equation is true, and then automatically resetting the phase detector $\theta$ to a low state, the output waveform of $\theta'$ results. The small error denoted by the hatch area still exists since the correction does not take place during the existency of the noise pulse; however, the former large error is reduced to a very small error.

A similar equation $$A \cdot B \cdot \theta \cdot \Psi = 1 \tag{3}$$

is used to correct the $\Psi$ error; a logic gate is operated when this equation is true to reset the $\Psi$ phase detector to low.

Figure 3:
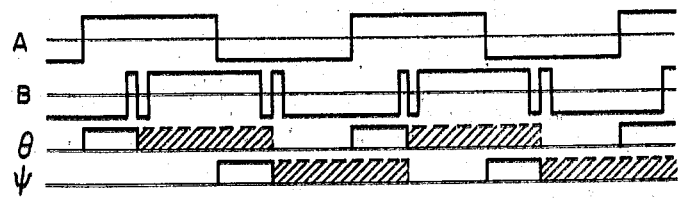

Noise on channel B can also cause false triggering and phase detectors turn off too soon. This condition is shown in FIG. 3. The false negative-going transition on signal B at the normal positive-going transition region turns $\theta$ off too soon, resulting in the error shown by the hatch region. The false positive-going transition at the normally negative transition of B turns $\Psi$ off too soon.

Two additional error detection and correction equations are then utilized.

$$A \cdot B \cdot \overline{\theta} \cdot \overline{\Psi} = 1 \text{ Set } \theta \text{ high} \tag{4}$$

$$\overline{A} \cdot \overline{B} \cdot \overline{\theta} \cdot \overline{\Psi} = 1 \text{ Set } \Psi \text{ high} \tag{5}$$

Figure 4:
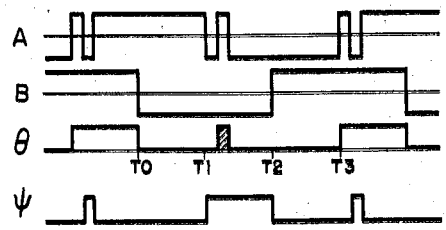

Consideration is now given to the effect of the above four error detection equations, with reference to the traces of FIG. 4. Looking at signal $\theta$, during the time interval T1 to T2 the correction equation (2)

$$\overline{A} \cdot \overline{B} \cdot \theta \cdot \Psi = 1$$

can operate as soon as the noise pulse is gone, and $\theta$ is reset to a low state.

Figure 5:
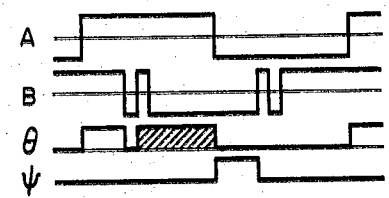

The pulse $\theta$ is supposed to be low also during the time interval T0 to T1 but none of the four corrections equations (2) to (5) apply. It is possible for $\theta$ to get set high during that time interval, and a large error result, if there is noise on channel B. This can be seen from FIG. 5. With noise appearing at the normally negative-going transition period of B, $$A \cdot B \cdot \overline{\theta} \cdot \Psi = 1$$

and, since this condition operates to set $\theta$ high, the error in $\theta$ represented by the hatch region occurs. Thus, instead of correcting an error, the error detection system operates to create an error. Once $\theta$ is set high by the positive-going error transition, it should be set low again by the following negative-going transition of the noise pulse, but this may not happen and the error continues until $\theta$ is set low at the negative transition of A. This problem can be corrected by generating another correction equation, $$A \cdot \overline{B} \cdot \theta \cdot \overline{\Psi} = 1 \text{ Set } \theta \text{ low} \tag{6}$$

It takes four equations to cover all the cases, and each correction equation now has two terms:

$$(\overline{A} \cdot B \cdot \overline{\theta} \cdot \Psi) + (A \cdot B \cdot \theta \cdot \Psi) = 1 \text{ Reset } \theta \text{ low} \tag{7}$$

$$(A \cdot B \cdot \theta \cdot \Psi) + (A \cdot B \cdot \overline{\theta} \cdot \Psi) = 1 \text{ Reset } \Psi \text{ low} \quad (8)$$

$$(A \cdot B \cdot \overline{\theta} \cdot \overline{\Psi}) + (A \cdot \overline{B} \cdot \overline{\theta} \cdot \Psi) = 1 \text{ Set } \theta \text{ high} \quad (9)$$

$$(\overline{A} \cdot \overline{B} \cdot \overline{\theta} \cdot \overline{\Psi}) + (\overline{A} \cdot B \cdot \theta \cdot \overline{\Psi}) = 1 \text{ Set } \Psi \text{ high} \quad (10)$$

Referring back to FIG. 4, these four equations will now insure control of $\theta$ during time intervals T0 to T1 and T1 to T2. The situation during time T3 is illustrated in FIG. 6.

In FIG. 6, channels A and B are shown both clean and both noisy. Transition points of the various wave forms are numbered 1 through 10 and these transitions occur as follows:

1. $\Psi$ goes low due to transition on B or by the equation $\overline{A} \cdot B \cdot \overline{\theta} \cdot \Psi$
2. $\Psi$ goes high due to equation $\overline{A} \cdot \overline{B} \cdot \overline{\theta} \cdot \overline{\Psi}$
3. Same as 1.
4. Same as 2.
5. Same as 1.
6. $\theta$ goes high due to the transition on A or by the equation $A \cdot B \cdot \overline{\theta} \cdot \overline{\Psi}$
7. $\Psi$ goes high due to the transition on A or by the equation $\overline{A} \cdot B \cdot \theta \cdot \overline{\Psi}$
8. $\Psi$ goes low due to the equation $A \cdot B \cdot \theta \cdot \Psi$
9. Same as 7.
10. Same as 8.

Thus in the interval T2 to T3 the $\theta$ waveform is correct and no more equations are needed.

Study of FIG. 6 shows that noise on the leading edge of B, points 1 through 5, has no effect on $\theta$; however $\Psi$ is affected. Assuming the noise is centered about the normal clean transition of B and that, during the time the noise exists on B, $\Psi$, on the average, spends as much time in the low state as the high state, the error on $\Psi$ caused by this noise averages to zero. With the noise symetrically distributed about the clean B transition, $\Psi$ loses some area on the left side of the transition and gains some area on the right side, averaging out. The same type of condition occurs on $\theta$ if there is noise on the trailing edge of B. Thus, for this relationship, the error on $\theta$ and $\Psi$ caused by noise on channel B averages to zero. Should channel A be clean, a phase reading with no error results.

With a noise signal on channel A as seen in FIG. 6, a pretriggering error occurs on $\theta$ represented by the hatch region starting at point 6.

However, noise on channel A with a clean channel B will produce an error signal in both $\theta$ and $\Psi$ as shown in FIG. 6, points 6 through 10. The error on $\theta$ is due to pretriggering; the error on $\Psi$ is due to false triggering. Each phase detector will exhibit both these type errors.

The fact that the B channel noise error averaged to zero and the A channel noise error did not is due to the particular phase difference between A and B chosen for FIG. 6. If a phase 180° different had been chosen, the A channel error would have averaged to zero and the B channel error would not be averaged out. In the areas where the transitions of A and B overlap there will be some error contributed by the noise on each channel.

The two trigger circuits or phase detectors used to produce the phase modulated output pulses have a region where they encounter some difficulty in producing the correct pulse output. If the on and off pulses for a trigger circuit occur at nearly the same time, the circuit may fail to respond to one of the pulses, or it may interpret them as a single pulse and respond accordingly. This limits the high frequency performance of the system. At any frequency there is some particular region where the on and off pulses will be too close to permit proper operation of the circuit. In addition, the correction scheme for the phase detectors also has a region where the circuit will not operate properly; the size of this region depends on the amount of noise in each channel. It is very desirable to make these two regions of improper operation occur in the same place and to then avoid operation in these regions.

In the present invention, circuit means are provided for detecting approach to this undesirable region and to then invert one of the channels A or B to remove the operation from that potential problem area. FIG. 7 illustrates the case where A and B are close to 180° out-of-phase, and channel A is going through a positive-going transition and channel B is going through a negative-going transition shortly thereafter, which would normally produce a $\theta$ pulse of short duration, and noise occurs on channel A. The false negative-going transition of A turns on $\Psi$ and creates a substantial error signal. The second or false positive-going transition of A produces an error on $\theta$ which is also large.

It would seem that the same type of errors would occur where the A and B channel transitions are very close together in the 0° phase difference region. However, if the same analysis utilized in the above-described Figures is employed for the various transitions that occur when A and B are near 0°, it will be seen that any noise generated error will be corrected after the system has settled into a steady-state condition, with the exception of two possible situations. The two error situations could be corrected by using the remaining two equations in the set of 16 that result from the four variables A, B, $\theta$, $\Psi$. These equations are $$A \cdot B \cdot \overline{\theta} \cdot \Psi = 1$$
$$\overline{A} \cdot \overline{B} \cdot \theta \cdot \overline{\Psi} = 1$$

However, if they are not used, the phase measurement is not hurt since the two variables are both wrong, and the average value of their sum yields the correct phase reading at the output. Thus, at a 0° difference, where the transition and noise of A and B may overlap, either the correction technique will place $\theta$ and $\Psi$ in their correct states, or, if they are in error states which are not corrected, the errors will cancel when summed so the output reading will be correct.

In a preferred embodiment of this invention then, two phase detectors, $\theta$ and $\Psi$, are used, with $\theta$ triggering on when A makes a positive transition and off when B makes a negative transition. Phase detector $\Psi$ is triggered on by a negative transition of A and off by a positive transition of B. The phase detectors are arranged to give a negative voltage at the output. $\theta$ and $\Psi$ each have a 50 percent duty cycle when A and B are in phase, and, as discussed above, the correction technique operates properly in this region. A voltage output is provided which renders 0.010V per degree difference, and when A and B are in phase the sum of the $\theta$ output and the Ψ output is −1.8v. Provision is therefore made to add +1.8v to yield a 0V reading for the 0° phase difference.

As explained above, the correction technique does not function property in the 180° phase difference region, so means is provided to detect when this region is approached, for example at 90° or 100°, and one of the channels A or B inverted to move away from the region. When a channel is inverted, the output reading would become incorrect, so offset voltages are added to the voltage output to retain the correct reading of phase.

The traces shown in FIGS. 8, 9, and 10 illustrate the manner of producing the desired output voltage for the range of phase difference readings. The ± 100° point has been chosen to perform the channel inversion, and between ±100° and −100° the channels A and B are in their normal state. In this state, a signal Q is developed, and Q=1 between +100° and −100°. FIG. 8 illustrates this condition and at 0° the sum of the output voltages of θ and is −1.8v. Therefore, an offset voltage X of +1.8V is added to θ + Ψ over the entire range between +100° and −100° to give a composite voltage output θ + Ψ +X ranging from +1.0V to − 1.0V and 0V at 0°.

When the phase difference is greater than 100°, Q=0 and one of the channels, e.g., channel B, is inverted. The voltage output of θ and Ψ is shown in FIG. 9 for the region between −100° and −180° and the region between +100° and +180°. Both the X offset voltage of +1.8V and a Y offset voltage of +1.8V, or a total of +2.6V, is added to the θ + Ψ voltage between +100° and +180° to produce the composite voltage between +1.0V and +1.8V in this region.

The overall composite signal, combining the signals of FIGS. 8 and 9, is shown in FIG. 10. Points M, T, and P on the output characteristic are detection levels used to control the offset voltages X and Y as described below. The equations that control the offset are $$+1.80 = Q + M_s + T \cdot P_s$$
$$+1.80 = M_s + Q \cdot P_s \cdot T$$

where $M_s$ and $P_s$ signify outputs from storage circuits that are activated when the end points or levels M and P are passed and the transition from one end of the output characteristic to the other end is made. The storage elements are deactivated by the detector at point T.

Figure 11:
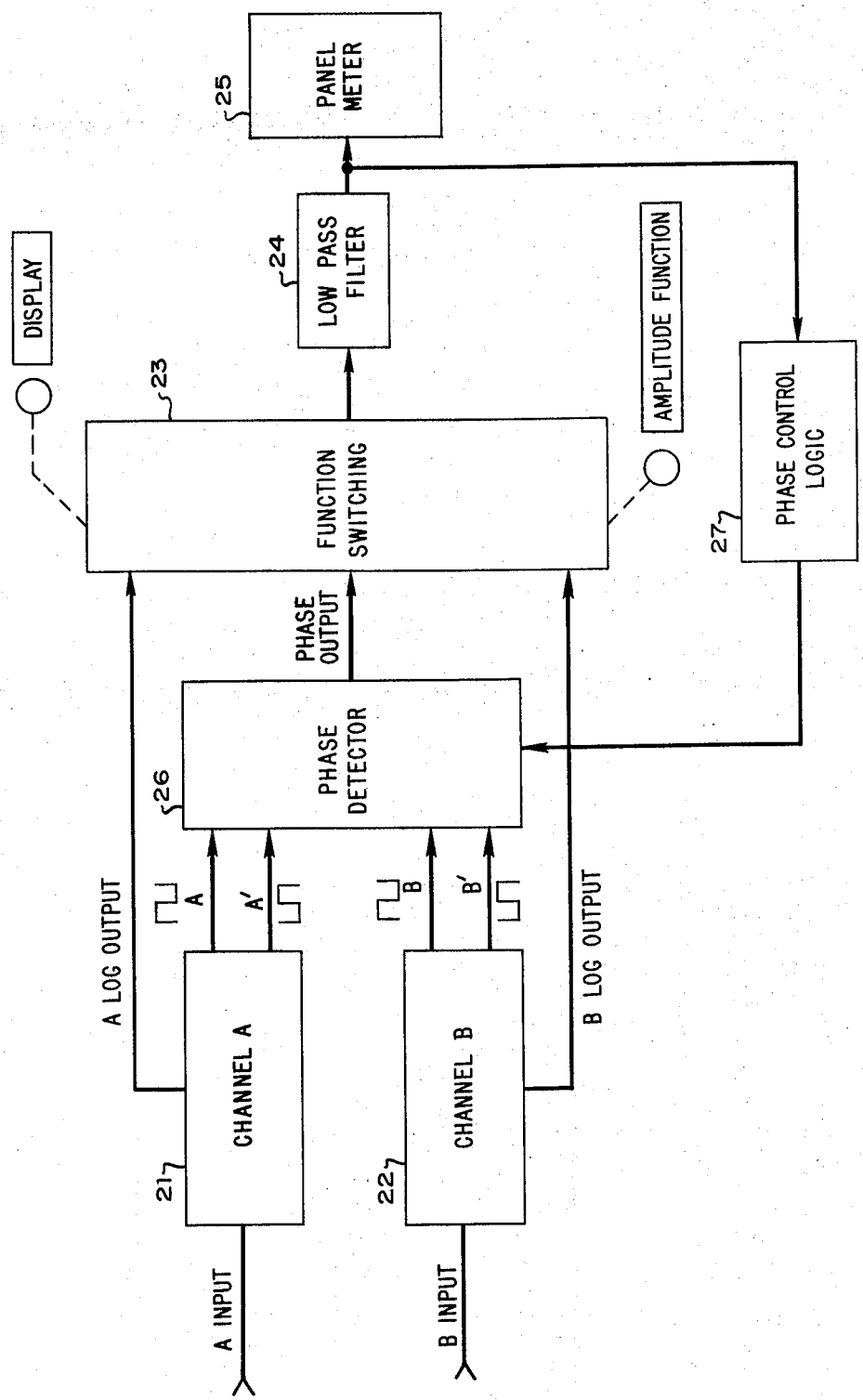
FIG. 11 is a block diagram of one embodiment of the phase measuring system incorporating the present invention.
Figure 12A:
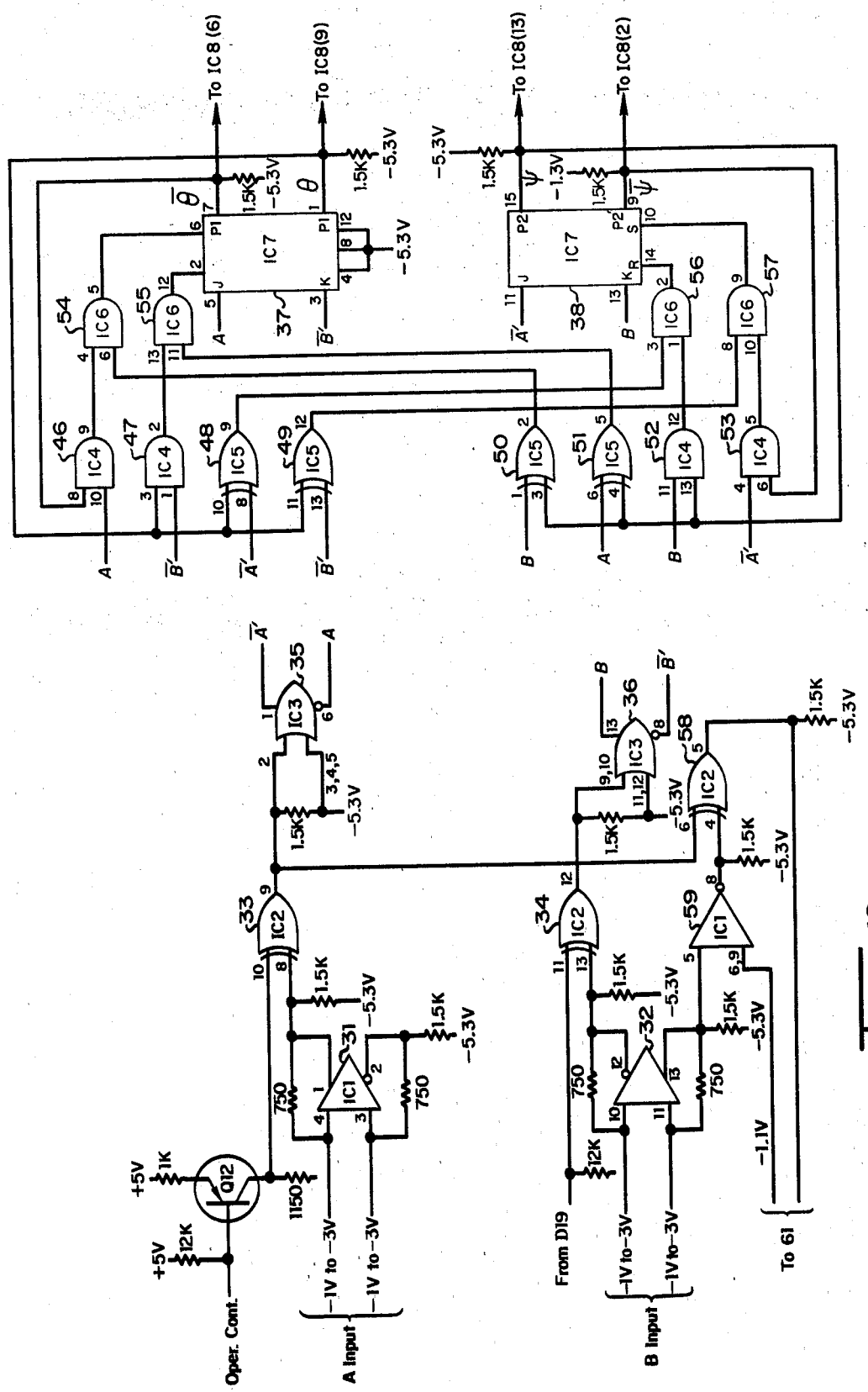
FIGS. 12a–12b and 13a–13b are schematic diagrams of the phase measuring system of FIG. 11.
Figure 12B:
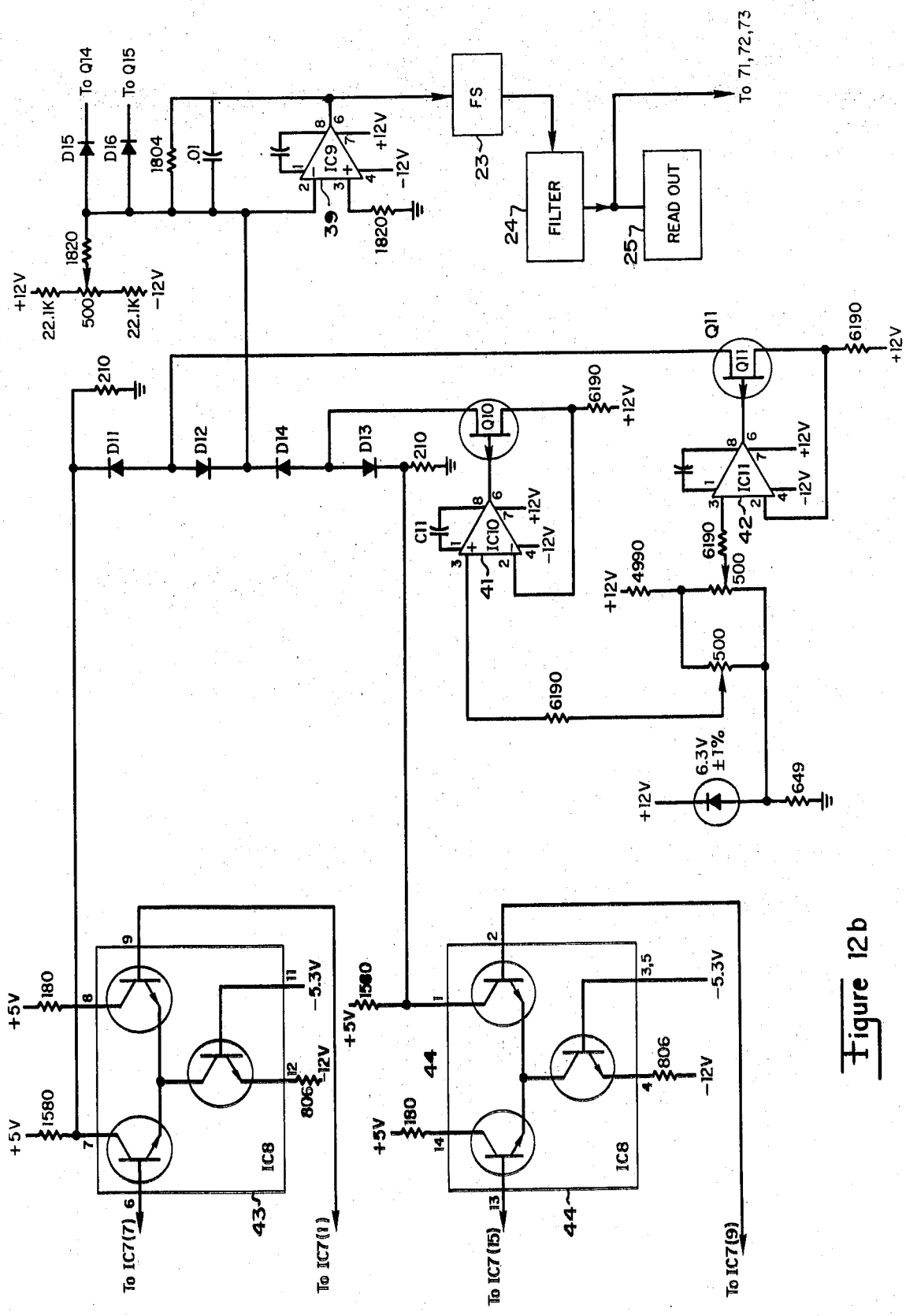
Figure 13A:
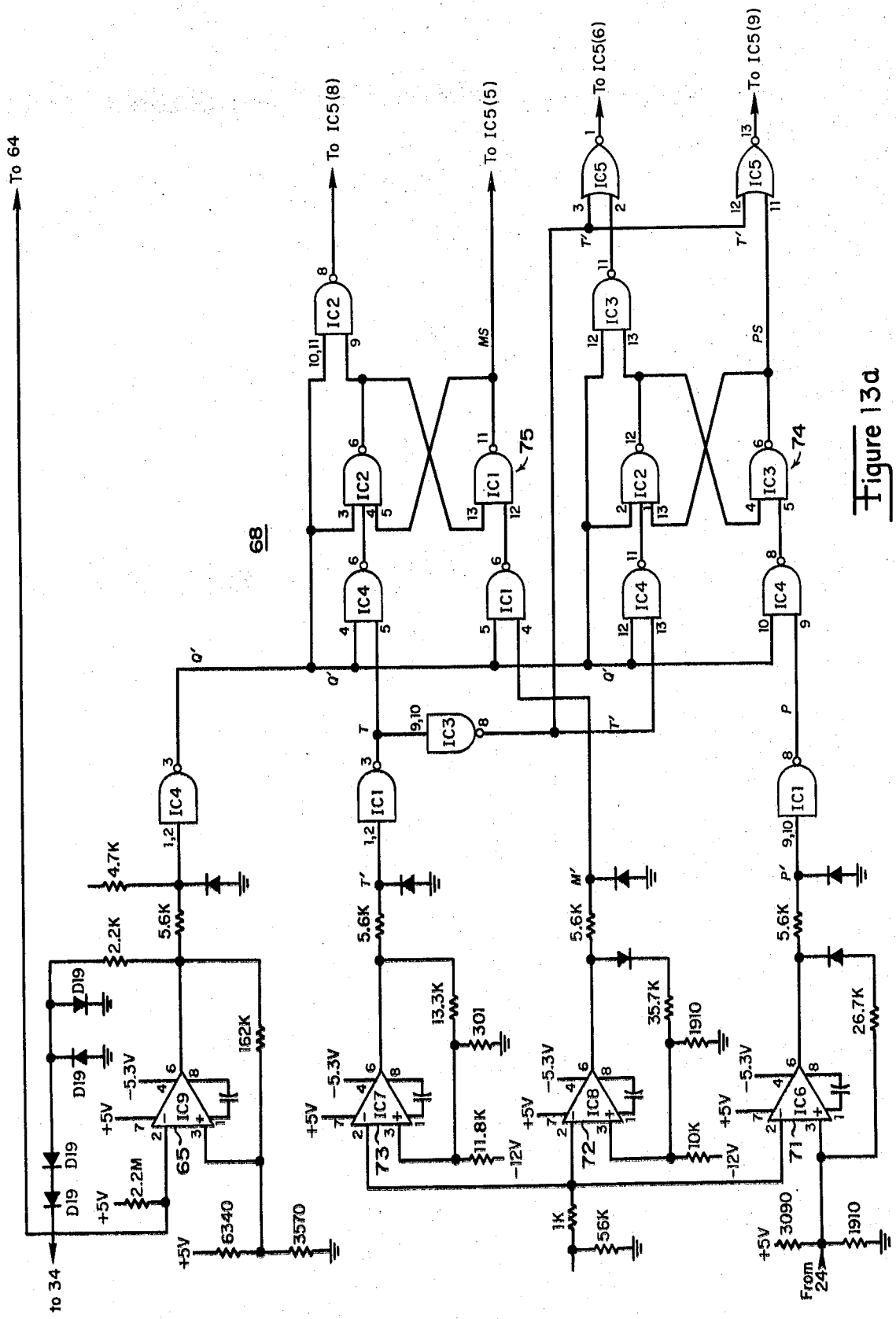
Figure 13B:
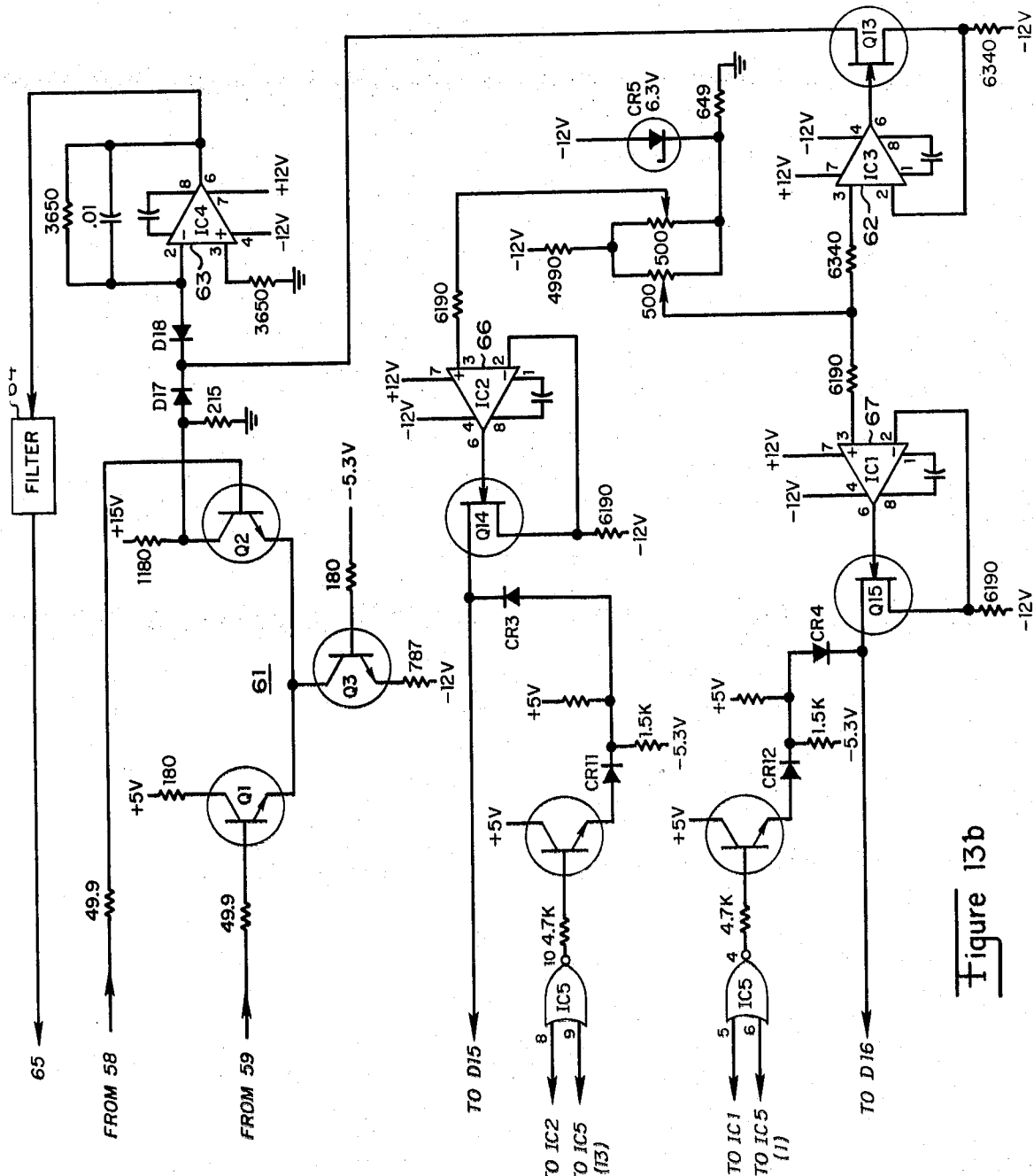

A preferred embodiment of this invention is shown in FIGS. 11, 12 and 13 incorporated in a phasemeter including a channel A input circuit 21 and a channel B input circuit 22, each including standard circuits for conditioning the incoming sine wave signals, producing square wave outputs utilized for the phase measurements, and producing logarithmic outputs in well known manner that are used for amplitude measurements. The logarithmic outputs are applied directly to function switching cirucits 23 where they are individually selected, i.e., Log A or Log B, or summed (Log B/A) and applied to a suitable filter 24 and panel meter 25 in the amplitude display mode.

The square wave outputs are used to control two J-K flip-flops in the phase detector circuitry 26 which provides the DC output voltage proportional to the phase difference between the two input signals. This DC output is coupled through the function switching circuits 23 and the output filter 24 to the panel meter 25. The output is also transmitted to the phase control logic 27 when in the phase display mode. The phase control logic 27 senses the magnitude and polarity of the phase output voltage and applies the proper DC offset voltages to the phase detector circuits 26 to maintain a correct phase read out.

The phase detector circuitry 26 is shown in FIG. 12. The two incoming square wave signals, A and B, each enter as two complimentary signals somewhere between −1 and −3V volts to associated level translator circuits 31 and 32, respectively, which operate to convert the incoming signals to suitable levels to drive emitter coupled logic. The square wave output of each level translator is coupled to one input of an associated exclusive OR gate 33 and 34, respectively, the other inputs of which are coupled to means for controlling the associated gate 33, 34 to invert the square wave pulse train output thereof as described below.

The outputs of gates 33 and 34 are coupled to driver circuits 35 and 36, respectively, for the two J-K flip flop circuits 37 and 38, driver 35 providing pulse trains A and $\overline{A}$ and driver 36 providing pulse trains B and $\overline{B}$. A positive-going transition on J of the associated flip-flop turns it on while a positive-going transition on K turns the flip-flop off. Flip-flop 37 corresponds to the θ phase detector and flip-flop 38 corresponds to the Ψ phase detector.

The rectangular pulse output of the two flip-flops is converted to a DC voltage proportional to the measured phase difference by gating current sources into amplifier 39. The current source for Ψ flip-flop 38 comprises FET Q10 and amplifier 41 and is gated into amplifier 39 by diodes D11 and D12. The θ flip-flop current source comprises FET Q11 and amplifier 42 and is gated into amplifier 39 by diodes D13 and D14. Stages 43 and 44 are incorporated to insure the proper gating on-off of the diodes. The currents from the two current sources are summed into amplifier 39, the X offset voltage and Y offset voltage being added to the summing junction via diodes D15 and D16, respectively, as needed to give the desired −1.8V to +1.8V output from amplifier 39 via the junction switch circuit 23 and filter 24 to the panel meter 25.

The logic circuitry comprising the standard form of gates 46 through 57 performs the logic functions (7) to (10) set forth above to set or reset the flip-flops 37 and 38 to correct for any errors that may occur in the switching of the flip-flops due to the noise induced multiple transistions of square wave pulses A and B.

Transistor circuit Q12 is provided as a convenience to give the operator an external control over the exclusive OR gate 33 to permit the operator to invert channel A should he desire to do this.

The channel B exclusive OR gate 34 is under the control of detecting means which senses when the phase difference between channel A and channel B signals is near 100° to automatically invert channel B to move away from this problem region as discussed above. When this region is being approached is signaled by the circuit including exclusive OR gate 58, delay 59, driver stage 61, and associated amplifier 63. Gate 58 receives the $\overline{A}$ pulse train from gate 33 and the $\overline{B}$ pulse train via circuit 59, circuit 59 being used simply to match the delay of the B pulses to that of the A pulses. The output of gate 58 is transmitted to the driver stage 61 which operates the gating diodes D17, D18 to gate the current source Q13,62 into the amplifier 63.

The output of amplifier 63 is a triangular shaped wave function of the phase difference between pulse A and pulse B. The output is a minimum or zero for 0° phase difference, rises linearly to a maximum output at 180°, and falls linearly back to a minimum or zero output at 360°. The output of amplifier 63 is transmitted via a suitable filter 64 to one input of a comparator 65 which operates as a switch to switch about the DC level signifying the 100° phase difference. The output of comparator 65 is level translated via diodes D19 and applied to one input of gate 34 to thereby invert the B pulses when the phase difference between A and B is 100° or more, the channel B switching back to normal when the phase difference is less than 100°. It should be understood that the phase shift chosen was arbitrary, for example 90° or 110° could have been selected as the switching point.

As discussed above, offset voltages X and Y are developed for summing with the voltage output of the phase detectors to produce the desired voltage output range of −1.8V to +1.8V. the X offset voltage of 1.8V is produced by gating the current source Q14,66 into the summing junction of amplifier 39 via diode D15. The Y offset voltage of +1.8V is produced by gating the current Q15,67 into the summing junction via diode D16. These current sources are controlled by the combinational logic circuitry 68 including the three comparator circuits 71–73 and two memory stages or set-reset flip-flops 74, 75.

As discussed above with relation to FIGS. 8–10, the offset voltage X is desired between −100° and +100° for addition to $\theta + \Psi$ while both offset voltages X and Y are desired between +100° and +180°. Thus, offset voltage X is on when Q=1; this condition exists when the output of comparator 65 is high. As discussed above, the output of amplifier 63 is 0 volts when the phase difference is 0°. Comparator 65 is saturated toward the +5 volts, and this is logic 1, i.e., Q=1. The combinational logic 68 operates to gate the current source Q14,66 on to add the X voltage offset.

As the phase difference moves from 0°, the output of amplifier 63 increases until, at 100°, The voltage output is sufficeint to switch the output of comparator 65 low, i.e., Q=0. In this state, and for phase differences between +100° and +180°, the combinational logic operates to gate on both current sources Q14,66, and Q15,67, and both X and Y offset voltages of +1.8V each are added to the $\theta + \Psi$ voltage to bring the final output voltage to the range of +1.0V to +1.8V. Between −100° and −180°, the final output voltage reading is correct and no offset voltage is added, so both X and Y current sources are gated off.

As the phase difference reading reaches 180°, i.e., +1.80V, and moves toward 190°, this system will recycle, since the output readings range between −180° and +180°, to read near the −180°, i.e., −1.8V. At this point it is necessary to turn off both the X and Y offset voltages.

The output of amplifier 39, after passing through filter 24, is transmitted to an input of each of three comparators, the P comparator 71, the M comparator 72, and the T comparator 73. When the input voltage exceeds the voltage at point P (FIG. 10), comparator 71 saturates and changes state, causing the combinational logic to operate to switch both current sources Q14 and Q15 off. As the output voltage moves from the +1.8V toward the −18.V end, it passes through point P again, and the voltage level sensing comparator 71 again changes state. However, the set-reset flip-flop in the combinational logic serves as a memory device and does not change state at this time so the X and Y offset voltages remain off.

As the output voltage passes through point T on its way in the negative direction, comparator 73 operates to reset the flip-flop.

Level sensing comparator 72 operates in the same manner as comparator 71 to recycle the readout when the phase difference being measured is near −180° and then moves toward −190° so that the output voltage moves past point M. In this case the combinational logic operates to turn both the X and Y offset voltages on, and the reading moves up toward the +180° end.

In the above described preferred embodiment, two phase detectors were employed to perform the error correction. However, correction equations may be developed and set and reset signals generated in the same manner as described above in a system employing only one phase detector, although the dual system has advantages.

In a system with a single phase detector $\theta$ triggered on with a positive transition on channel A and a negative transition on channel B, the three variables A, B, and $\theta$ can be combined in eight possible terms. Six of these terms become true during normal phase measuring operations. The remaining two terms can be used for error correction; $\overline{A} \cdot \overline{B} \cdot \theta$ can set $\theta$ to a high state and $\overline{A} \cdot \overline{B} \cdot \theta$ can reset $\theta$ to a low state and the output of $\theta$ can be controlled and corrected when false triggering occurs. A problem area exists near 180° as with the dual system. However, there are situtations where errors are generated and cannot be corrected in the single detector system whereas they are corrected in the dual system. In this respect the single detector system is an incomplete solution to the problem compared to that provided by the dual system.

What is claimed is:

1. Apparatus for measuring the phase difference between two incoming AC signals comprising
   a phase detector operable in either of two operating states in response to applied signals;
   means coupled to said phase detector and responsive to each zero crossing in at least one direction of one incoming AC signal for producing a first transistion of said phase detector to a first state,
   means coupled to said phase detector and responsive to each zero crossing in at least one direction of the other incoming AC signal for producing a second transition of said phase detector to a second state, the interval between said two transitions providing a measure of the phase difference between the two incoming signals and multiple zero crossings of one of said incoming signals at times within the interval between zero crossings of the other of said incoming signals producing an undesired transition of said phase detector to an incorrect state,
   means coupled to said phase detector for detecting the incorrect state of said phase detector,
   and means responsive to said detecting means for changing the state of said phase detector to the correct state.

2. Apparatus as claimed in claim 1 including
   means for converting said two incoming AC signals to square wave signals, each having a first state and a second state, and
   said means for detecting the incorrect state of said phase detector comprising logic circuit means for detecting the instantaneous states of said two square waves and said phase detector.

3. Apparatus for measuring the phase difference between two incoming AC signals comprising first and second logic means, each operative in either one of two logic states in response to an applied signal, means for converting said two incoming AC signals to resultant signals, each having a first and second discrete logic state, means coupled to said logic means and responsive to the opposite zero crossings of one resultant signal for producing a first transition of said first logic means to a first state and a first transition of said second logic means to a first state, respectively, means coupled to said logic means and responsive to the opposite zero crossings of the other resultant signal for producing a second transition of said first logic means to a second state and a second transition of said second logic means to a second state, respectively, the time intervals of said first and second logic means in one of said states of each logic means providing an indication of the phase difference between the two incoming signals and multiple zero crossings of one of said resultant signals at times within the interval between zero crossings of the other of said resultant signals producing an undesired transition of one of said logic means to an incorrect state, circuit means for detecting the instantaneous logic states of said two resultant signals and of said two logic means for producing a correction signal therefrom, and means responsive to said correction signal for changing the logic state of one logic means operating in an incorrect state to the correct state.

4. The method of measuring the phase difference between two incoming AC signals comprising the steps of sensing one of the zero crossings of a first of said incoming AC signals, operating a trigger circuit to a first state responsive to said sensed zero crossing, sensing one of the zero crossings of the second of said incoming AC signals, operating said trigger circuit to a second state responsive to said latter sensed zero crossing, the intervals of said trigger circuit in said two states being dependent on the phase difference between said two incoming signals and multiple zero crossings of one of said incoming signals at times within the interval between zero crossings of the other of said incoming signals producing an undesired triggering of said trigger circuit to an incorrect state, sensing said incorrect state, and changing the state of said trigger circuit, in response to said sensed incorrect state, from said incorrect state to the correct state.

5. The method as claimed in claim 4 including the step of converting each of said two incoming signals to a related signal having a different state for each half cycle of the incoming signal, and wherein said step of sensing said incorrect state comprises sensing the instantaneous states of said two related signals and said trigger circuit and producing an error correction signal therefrom to change the state of said trigger circuit from the incorrect to the correct state.

6. The method of measuring the phase difference between two incoming AC signals comprising the steps of sensing the opposite zero crossings of a first of said incoming AC signals, sensing the opposite zero crossings of the second of said incoming AC signals, operating a first trigger circuit to a first state responsive to one of said sensed zero corssings of said first incoming signal and to a second state responsive to one of said sensed zero crossings of said second incoming signal, operating a second trigger circuit to a first state responsive to the other of said sensed zero crossings of said first incoming signal and to a second state responsive to the other of said sensed zero crossings of said second incoming signal, the intervals of each of said triggered circuits in their respective two states being dependent on the phase difference between said two incoming signals, multiple zero crossings of one of said incoming signals at times producing an undesired triggering of one of said trigger circuits to an incorrect state, sensing said incorrect state, and changing the state of said one trigger circuit from said incorrect state to the correct state.

7. The method as claimed in claim 6 including the step of converting each of said two incoming signals to a related signal, each related signal having a different state for each half cycle of the associated incoming signal, and wherein said step of sensing said incorrect state comprises sensing the instantaneous states of said two related signals and said two trigger circuits and producing an error correction signal therefrom to change the state of said trigger circuit from the incorrect to the correct state.

* * * * *

UNITED STATES PATENT OFFICE
CERTIFICATE OF CORRECTION

Patent No. 3,764,902          Dated October 9, 1973

Inventor(s) Thomas G. Rodine

It is certified that error appears in the above-identified patent and that said Letters Patent are hereby corrected as shown below:

Column 4, <u>line 66</u>, cancel "$(\overline{A} \cdot B \cdot \overline{\theta} \cdot \psi) + (A \cdot B \cdot \theta \cdot \psi) = 1$ Reset $\theta$ low (7)" and substitute -- $(\overline{A} \cdot \overline{B} \cdot \theta \cdot \psi) + (A \cdot \overline{B} \cdot \theta \cdot \overline{\psi}) = 1$ Reset $\theta$ low (7) --

Column 5, <u>line 1</u>, cancel "$(A \cdot B \cdot \theta \cdot \psi) + (A \cdot B \cdot \overline{\theta} \cdot \psi) = 1$ Reset $\psi$ low (8)" and substitute -- $(A \cdot B \cdot \theta \cdot \psi) + (\overline{A} \cdot B \cdot \overline{\theta} \cdot \psi) = 1$ Reset $\psi$ low (8) --

Column 7, <u>line 21</u>, after "and" insert -- $\psi$ --; <u>line 40</u>, cancel " $+ 1.80 = Q + M_s + T \cdot P_s$" and insert -- $+ 1.80 = Q + M_s + T \cdot \overline{P}_s$ --; <u>line 41</u>, cancel " $+ 1.80 = M_s + Q \cdot P_s \cdot T$" and substitute -- $+ 1.80 = M_s + \overline{Q} \cdot \overline{P}_s \cdot T$ --

Signed and sealed this 19th day of March 1974.

(SEAL)
Attest:

EDWARD M. FLETCHER, JR.
Attesting Officer

C. MARSHALL DANN
Commissioner of Patents